United States Patent
Zhang

(10) Patent No.: US 9,755,686 B2
(45) Date of Patent: Sep. 5, 2017

(54) ALLOY ENCAPSULATION MOBILE PHONE PROTECT CASE

(71) Applicant: Shenzhen Qilixin Plastic Precision Mould Co., Ltd., Shenzhen, Guangdong (CN)

(72) Inventor: Qifeng Zhang, Guangdong (CN)

(73) Assignee: Shenzhen Qilixin Plastic Precision Mould Co., Ltd., Shenzhen, Guangdong (CN)

( * ) Notice: Subject to any disclaimer, the term of this patent is extended or adjusted under 35 U.S.C. 154(b) by 201 days.

(21) Appl. No.: 14/790,317

(22) Filed: Jul. 2, 2015

(65) Prior Publication Data
US 2016/0006474 A1    Jan. 7, 2016

(30) Foreign Application Priority Data
Jul. 4, 2014   (CN) .......................... 2014 1 0315826

(51) Int. Cl.
*H04M 1/00* (2006.01)
*H04B 1/3888* (2015.01)

(52) U.S. Cl.
CPC ................................. *H04B 1/3888* (2013.01)

(58) Field of Classification Search
CPC ........................... H04M 1/0283; H04B 1/3888
USPC ............................................ 455/575.8, 575.1
See application file for complete search history.

(56) References Cited

U.S. PATENT DOCUMENTS

| | | | | |
|---|---|---|---|---|
| 2006/0268528 A1* | 11/2006 | Zadesky | ............... | H04M 1/026 361/728 |
| 2012/0244848 A1* | 9/2012 | Ghaffari | ................. | H04M 1/04 455/415 |

* cited by examiner

*Primary Examiner* — Chuck Huynh

(57) ABSTRACT

A method for preparing an alloy encapsulation mobile phone protective case is provided, which includes steps of: selecting an alloy material as an edging material; CNC machining; making a surface treatment; drying; spraying and molding for shaping. The alloy encapsulated mobile phone protective case is formed after shaping the alloy outer frame and the soft rubber inner molding layer, which not only simplifies the assembly, but also strengthens the strength and hardness of the structure, thus effectively avoiding the splitting phenomenon caused by strong impact. Due to the combination of the alloy material with the soft rubber inner molding layer, the protective case has a certain flexibility, abrasion resistance, high strength and high formability. The rigidity of the protective case is in a range from 50° to 90°and has strong resilient force and curvature, which not only can effectively protect the mobile phone, but also has long service life.

5 Claims, 2 Drawing Sheets

US 9,755,686 B2

ALLOY ENCAPSULATION MOBILE PHONE PROTECT CASE

CROSS REFERENCE OF RELATED APPLICATION

The present invention claims priority under 35 U.S.C. 119(a-d) to CN 201410315826.7, filed Jul. 4, 2014.

BACKGROUND OF THE PRESENT INVENTION

Field of Invention

The present invention relates to a production technology field of a mobile phone protective case, and more particularly to an alloy encapsulation mobile phone protective case and a preparation method thereof.

Description of Related Arts

Existing mobile phone protective cases, such as IPhone, Samsung and other mobile phone protective cases, are generally directly made of plastics or thermoplastic polyurethane elastomer combined with zinc alloy or aluminum alloy, wherein a layer of rigid lining is provided between the plastics or thermoplastic polyurethane elastomer and zinc alloy or aluminum alloy. The above mobile phone protective case has shortcomings whether in the production process or the structure as follows.

(1) Combination sets and alloy protective cases on the existing market are not a single product, but an assembly result with complex operation by two or more products. Furthermore, during the usage, if strong impact occurs or the mobile phone falls off, it is easy for the protective case to be detached from the mobile phone, so that it is unable to effectively protect the mobile phone.

(2) The mobile phone protective case prepared by the above material has low strength and is easy to be worn. After a period of use, cracks occur on the surface of the protective case. Therefore, the above mobile phone protective case has higher update rate. Furthermore, during the manufacturing process, the material has low formability.

All in all, the existing mobile phone protective cases have been unable to meet the needs of the market.

SUMMARY OF THE PRESENT INVENTION

Aiming at shortcomings mentioned in the above technologies, the present invention provides an alloy encapsulation mobile phone protective case and a preparation method thereof with simple processes, flexible and convenient operation, low coast, stable structure and high strength and rigidity.

To achieve the above object, the present invention provides a method for preparing an alloy encapsulation mobile phone protective case, comprising steps of:

S1: selecting a molding material which specifically comprises a step of selecting an alloy material as an edging material;

S2: CNC machining, wherein an integrated molding alloy outer frame with standard size is formed by CNC machining;

S3: making a surface treatment which specifically comprises steps of making the surface treatment to the alloy outer frame, and treating impurities on a surface of the alloy outer frame;

S4: drying which specifically comprises a step of drying the alloy outer frame after surface treatment at a room temperature, so that the alloy outer frame has an optimized adhesive performance and weather resistant performance;

S5: spraying which specifically comprises steps of: spraying a basecoat glue to an internal surface of the dried alloy outer frame, spraying a topcoat glue after the basecoat glue is dried, and roasting drying for forming an early finished product, wherein a weight ratio of the basecoat glue to the topcoat glue is 4:6; and S6: molding for shaping which specifically comprises steps of inserting the early finished product into a back molding of an injection mold via a glue inputting mouth for molding to form a soft rubber inner molding layer on the surface of the alloy outer frame, and forming the alloy encapsulated mobile phone protective case after shaping the alloy outer frame and the soft rubber inner molding layer, wherein a rigidity of the shaped alloy encapsulated mobile phone protective case is 50-90°.

Preferably, the S3 specifically comprises steps of:

S31: removing impurities comprising oil, fingerprint, dust, mold release and rust on the surface of the alloy frame which affect the bonding;

S32: cleaning the surface via a dry cloth with acetone, butanone or isopropyl-ketone; and S33: making an oil injection after cleaning.

Preferably, conditions of drying are: a drying time of 1.5 hours and a humidity of 45%; or a drying time of 4 min and a temperature of 93°; or a drying time of 2 min and a temperature of 138 degrees Celsius.

Preferably, the basecoat glue and the topcoat glue are used by soaking, brushing or spraying methods, and a sum of thicknesses of two glues is in a range from 2.5 µm to 12.7 µm.

Preferably, the basecoat glue is CH219-model basecoat glue, and the topcoat glue is CH213-model topcoat glue.

To achieve the above object, the present invention provides an alloy encapsulated mobile phone protective case, which comprises an integrated molding alloy outer frame, wherein a molding groove is provided on an internal surface of the alloy outer frame, a basecoat glue layer and a topcoat glue layer are attached to an internal surface of the molding groove in sequence and then a soft rubber inner molding layer is molded thereto; a smooth spray painting layer is sprayed on an external surface of the alloy outer frame.

Preferably, a flow baffle, adapted for avoiding an outflow of the molding soft rubber and protecting a bottom edge of a mobile phone, is formed by bending inwardly a bottom surface of the alloy outer frame.

Preferably, a plurality of limit sheets are formed by bending inwardly a top surface of the alloy outer frame, after fixing the mobile phone in the mobile phone protective case, the limit sheets lean against edges of the mobile phone.

Preferably, a key cap adaptive to a mobile phone key and a first through hole adaptive to a socket are provided on the soft rubber inner molding layer, a second through hole adaptive to the key cap and a third through hole adaptive to the first through hole are provided on the alloy outer frame.

Preferably, the soft rubber inner molding layer is made of thermoplastic polyurethane elastomer.

Compared with the prior art, the alloy encapsulation mobile phone protective case and the preparation method thereof provided by the present invention have beneficial effects as follows.

(1) The early finished product is inserted into the back molding of the injection mold via the glue inputting mouth for molding to form the soft rubber inner molding layer on the surface of the alloy outer frame, and the alloy encapsulated mobile phone protective case is formed after shaping the alloy outer frame and the soft rubber inner molding layer, which not only simplifies the assembly, but also strengthens the strength and hardness of the structure, thus effectively avoiding the splitting phenomenon caused by strong impact.

(2) Due to the combination of the alloy material with the soft rubber inner molding layer, the protective case has a certain flexibility, abrasion resistance, high strength and high formability. Therefore, the manufactured protective case not only has good texture due to no cracks and wears on the surface, but also is capable of closely contacting with the mobile phone for protecting the mobile phone.

(3) The rigidity of the shaped alloy encapsulated mobile phone protective case is in a range from 50° to 90°, and has strong resilient force and curvature, which not only can effectively protect the mobile phone, but also has long service life.

(4) The spraying technology is used, such that the alloy outer frame has better adhesive property and weather resistance for rapidly molding to further improve the structural performance.

(5) The technology has simple devices, simple processes and flexible operation, which is convenient for mass production, thus greatly reducing the manufacturing cost. Furthermore, the present invention has high strength and rigidity, stable structural performance and strong abrasive resistance.

These and other objectives, features, and advantages of the present invention will become apparent from the following detailed description, the accompanying drawings, and the appended claims.

Main component symbols are explained as below.
10: alloy outer frame; 11: soft rubber inner molding layer; 12: basecoat glue layer; 13: topcoat glue layer; 14: mobile phone; 101: molding groove; 102: flow baffle; 103: limit sheet; 104: second through hole; 105: third through hole; 111: key cap; 112: first through hole; 141: mobile phone key; 142: socket.

DETAILED DESCRIPTION OF THE PREFERRED EMBODIMENT

The present invention is further explained with the accompanying drawings in detail.

Figure 1:
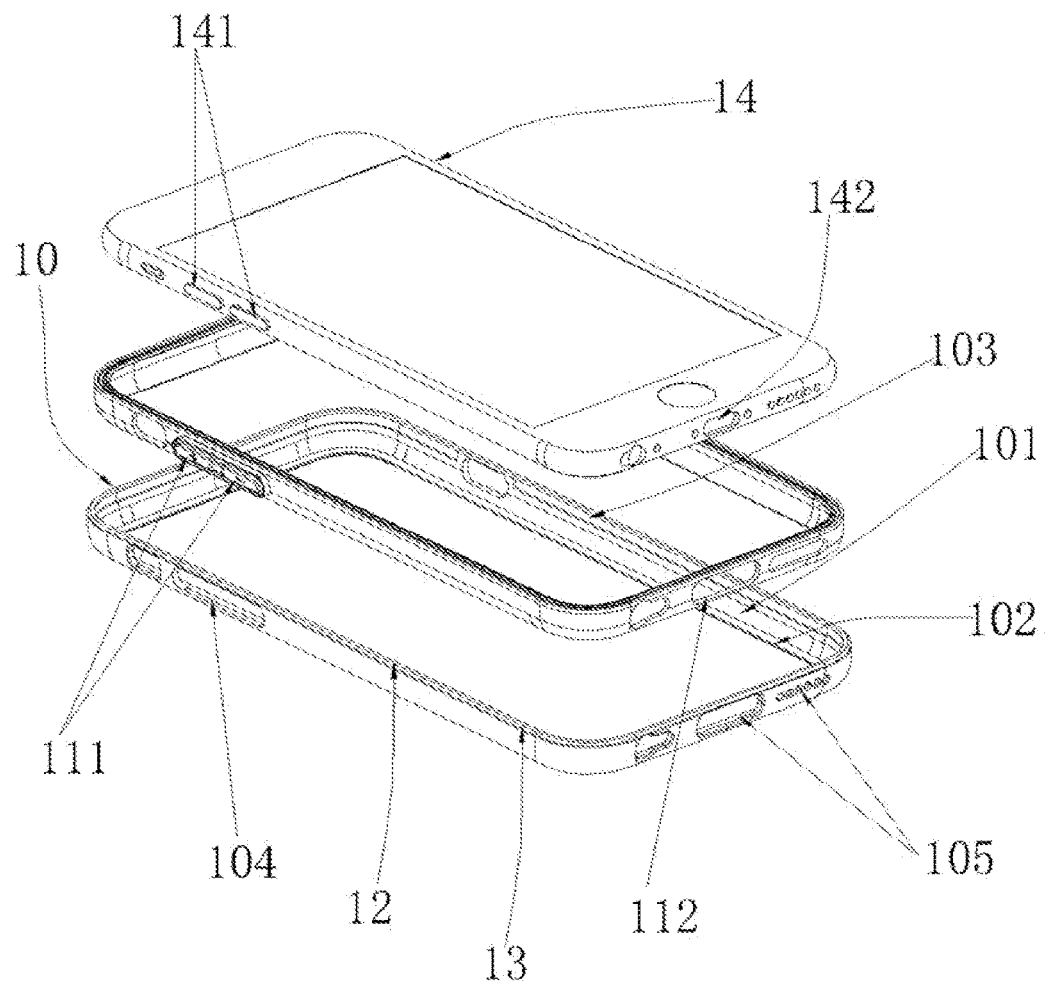
FIG. 1 is an exploded view of an alloy encapsulated mobile phone protective case according to a preferred embodiment of the present invention.

Referring to FIG. 1 of the drawings, an alloy encapsulated mobile phone protective case according to a preferred embodiment of the present invention is illustrated, wherein the alloy encapsulated mobile phone protective case comprises an integrated molding alloy outer frame 10, a molding groove 101 is provided on an internal surface of the alloy outer frame 10, a basecoat glue layer 12 and a topcoat glue layer 13 are attached to an internal surface of the molding groove 101 in sequence and then a soft rubber inner molding layer 11 is molded thereto; a smooth spray painting layer (not shown in the drawings) is sprayed on an external surface of the alloy outer frame 10.

Compared with the prior art, the alloy encapsulated mobile phone protective case of the present invention has some advantages as follows.

(1) The mobile phone protective case is formed by molding the soft rubber inner molding layer 11 to the alloy outer frame 10, which not only simplifies the assembly, but also strengthens the strength and hardness of the structure, thus effectively avoiding the splitting phenomenon caused by strong impact.

(2) Due to the combination of the alloy material with the soft rubber inner molding layer 11, the protective case has a certain flexibility, abrasion resistance, high strength and high formability. Therefore, the manufactured protective case not only has good texture due to no cracks and wears on the surface, but also is capable of closely contacting with the mobile phone for protecting the mobile phone.

(3) The basecoat glue layer 12 and the topcoat glue layer 13 are attached to the internal surface of the alloy outer frame 10, so that the alloy outer frame 10 has better adhesive property and weather resistance for rapidly molding to further improve the structural performance.

(4) The product has large intensity and hardness, stably structural performance, strong abrasive resistance and low cost, which is convenient for mass production.

In the preferred embodiment, a flow baffle 102, adapted for avoiding the outflow of the molding soft rubber and protecting a bottom edge of the mobile phone 14, is formed by bending inwardly a bottom surface of the alloy outer frame 10; a plurality of limit sheets 103 are formed by bending inwardly a top surface of the alloy outer frame 10.

After fixing the mobile phone 14 in the mobile phone protective case, the limit sheets 103 lean against edges of the mobile phone 14. Due to the blow baffle 102 and the limit sheets 103, it is convenient for the soft rubber inner molding layer 11 to mold in the alloy outer frame 10, and no scratching phenomenon occur on the edges of the mobile phone 14.

In the preferred embodiment, a key cap 111 adaptive to a mobile phone key 141 and a first through hole 112 adaptive to a socket 142 are provided on the soft rubber inner molding layer 11, a second through hole 104 adaptive to the key cap 111 and a third through hole 105 adaptive to the first through hole 112 are provided on the alloy outer frame 10. Due to the soft rubber inner molding layer 11 is made of soft material, the key cap 111 is set to more conveniently operate the mobile phone key 141. The positions of the through holes and the key cap are determined by the locations where the buttons of the mobile phone themselves are.

In the preferred embodiment, a sum of thicknesses of the basecoat glue layer 12 and the topcoat glue layer 13 is in a range from 2.5 to 12.7 μm. The basecoat glue layer 12 adopts CH219-model glue, the topcoat glue layer 13 adopts CH213-model glue, and the glues are able to form on the alloy outer frame 10 by soaking, brushing or spraying methods. To obtain optimally adhesive and weather resistant performances, a thickness of the dried glue is between 2.5 μm and 12.7 μm. To obtain much higher adhesive and weather resistant performances, the dried glue with a thicker thickness is needed.

In the preferred embodiment, the alloy outer frame 10 is made of aluminum alloy or zinc alloy material. Of course, the alloy outer frame 10 also can be made of ferroalloy and other materials. The change to the type of the alloy material belongs to a simple deformation or transformation of the present invention, which falls within the protective cope of the present invention.

In the preferred embodiment, the soft rubber inner molding layer 11 is made of thermoplastic polyurethane elastomer. The thermoplastic polyurethane elastomer is abbreviated as TPU and has some excellent characteristics comprising high tension, high pulling force, toughness and aging resistance. It is a mature environmental protection material, and has some characteristics comprising high strength, good toughness, wear resistance, cold resistance, oil resistance, water resistance, aging resistance and weather resistance that other plastic materials can not compare. Simultaneously, it has some advantages comprising high water resistance and moisture permeability, wind resistance, cold resistance, antibacterial property, mildew proof, warmth retention, ultraviolet resistance and energy release. Due to the usage of TPU material, the mobile phone protective case has strong abrasive resistance.

Figure 2:
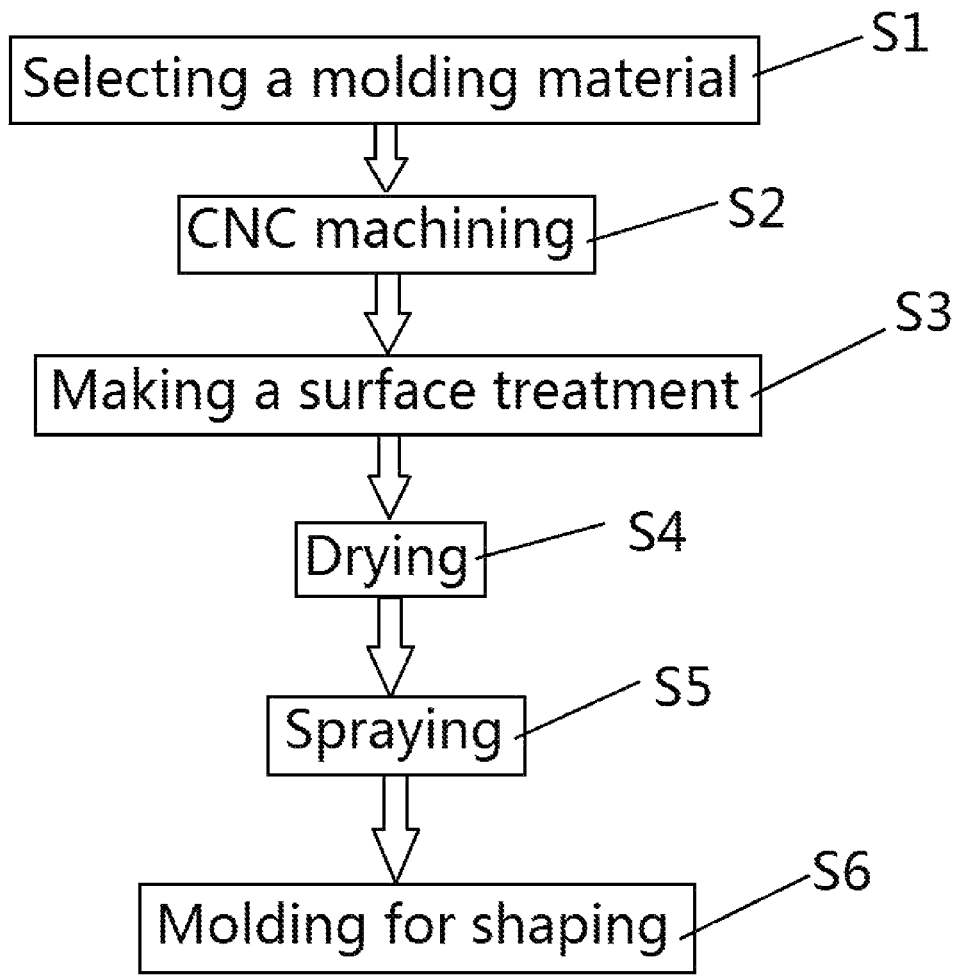
FIG. 2 is a process flow diagram of a method of preparing the alloy encapsulated mobile phone protective case according to the preferred embodiment of the present invention.

Referring to FIG. 2, a method for preparing an alloy encapsulated mobile phone protective case comprises steps of:

Step 1 (S1): selecting a molding material: which specifically comprises a step of selecting an alloy material as an edging material, wherein the alloy material is aluminum alloy or zinc alloy; of course, the alloy material is ferroalloy or other alloy material, the change to the type of the alloy material belongs to a simple deformation or transformation of the present invention, which falls within the protective cope of the present invention;

Step 2 (S2): CNC machining: wherein an integrated molding alloy outer frame with standard size is formed by CNC machining, wherein CNC is an abbreviation of computer numerical control and is a program-controlled automatic processing, which is in favor of processing the alloy outer frame;

Step 3 (S3): making a surface treatment making the surface treatment to the alloy outer frame, treating impurities on a surface of the alloy outer frame, which specifically comprises steps of: removing impurities comprising oil, fingerprint, dust, mold release and rust on the surface of the alloy frame which affect the bonding; cleaning the surface via a dry cloth with acetone, butanone or isopropyl-ketone after wearing chemically-resistant gloves; and making an oil injection after cleaning, wherein, if solvent is not able to be used, an alkaline detergent is able to be used;

Step 4 (S4): drying: which specifically comprises a step of drying the alloy outer frame after surface treatment at a room temperature, so that the alloy outer frame has an optimized adhesive performance and weather resistant performance, wherein conditions of drying are: a drying time of 1.5 hours and a humidity of 45%; or a drying time of 4 min and a temperature of 93°; or a drying time of 2 min and a temperature of 138 degrees Celsius, wherein the basecoat glue and the topcoat glue are used by soaking, brushing or spraying methods, a sum of thicknesses of two glues is in a range from 2.5 to 12.7 μm; to obtain much higher adhesive and weather resistant performances, the dried glue with a thicker thickness is needed, the thickness of the glue is able to be changed according to actual situations;

Step 5 (S5): spraying: which specifically comprises steps of: spraying the basecoat glue to an internal surface of the dried alloy outer frame, and then spraying the topcoat glue, and roasting drying for forming an early finished product, wherein a weight ratio of the basecoat glue to the topcoat glue is 4:6, the basecoat glue is CH219-model glue, the topcoat glue is CH213-model glue, wherein the CH219-model glue is a single-coated type, thermoplastic vulcanizate type adhesive for bonding a polyether or polyester-based cast polyurethane elastomer with metal or other rigid base materials, which is convenient for processing the alloy outer frame and a soft rubber inner molding layer in subsequent steps; the CH213-model glue is a single-coated type, thermoplastic vulcanizate type adhesive for bonding a thermoplastic, casting and reaction molding type polyurethane elastomer with metal or other rigid base materials, which is capable of generating higher adhesive strength than tearing polyurethane itself; and Step 6 (S6): molding for shaping: which specifically comprises steps of inserting the early finished product into a back molding of an injection mold via a glue inputting mouth for molding to form the soft rubber inner molding layer on the surface of the alloy outer frame, and forming the alloy encapsulated mobile phone protective case after shaping the alloy outer frame and the soft rubber inner molding layer, wherein a rigidity of the shaped alloy encapsulated mobile phone protective case is that of an internal thermoplastic polyurethane elastomer with 50-90° or that of engineering plastics.

The advantages of the preparing technology are as follows.

(1) The early finished product is inserted into the back molding of the injection mold via the glue inputting mouth for molding to form the soft rubber inner molding layer on the surface of the alloy outer frame, and the alloy encapsulated mobile phone protective case is formed after shaping the alloy outer frame and the soft rubber inner molding layer, which not only simplifies the assembly, but also strengthens the strength and hardness of the structure, thus effectively avoiding the splitting phenomenon caused by strong impact.

(2) Due to the combination of the alloy material with the soft rubber inner molding layer, the protective case has a certain flexibility, abrasion resistance, high strength and high formability. Therefore, the manufactured protective case not only has good texture due to no cracks and wears on the surface, but also is capable of closely contacting with the mobile phone for protecting the mobile phone.

(3) The rigidity of the shaped alloy encapsulated mobile phone protective case is in a range from 50° to 90°, and has strong resilient force and curvature, which not only can effectively protect the mobile phone, but also has long service life.

(4) The spraying technology is used, such that the alloy outer frame has better adhesive property and weather resistance for rapidly molding to further improve the structural performance.

(5) The technology has simple devices, simple processes and flexible operation, which is convenient for mass production, thus greatly reducing the manufacturing cost.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A method for preparing an alloy encapsulation mobile phone protective case, comprising steps of:
  S1: selecting a molding material which specifically comprises a step of selecting an alloy material as an edging material;
  S2: CNC machining, wherein an integrated molding alloy outer frame with standard size is formed by CNC machining;

S3: making a surface treatment which specifically comprises steps of making the surface treatment to the alloy outer frame, and treating impurities on a surface of the alloy outer frame;

S4: drying which specifically comprises a step of drying the alloy outer frame after surface treatment at a room temperature, so that the alloy outer frame has an optimized adhesive performance and weather resistant performance;

S5: spraying which specifically comprises steps of: spraying a basecoat glue to an internal surface of the dried alloy outer frame, spraying a topcoat glue after the basecoat glue is dried, and roasting drying for forming an early finished product, wherein a weight ratio of the basecoat glue to the topcoat glue is 4:6; and S6: molding for shaping which specifically comprises steps of inserting the early finished product into a back molding of an injection mold via a glue inputting mouth for molding to form a soft rubber inner molding layer on the surface of the alloy outer frame, and forming the alloy encapsulated mobile phone protective case after shaping the alloy outer frame and the soft rubber inner molding layer, wherein a rigidity of the shaped alloy encapsulated mobile phone protective case is 50-90°.

2. The method, as recited in claim 1, wherein the S3 specifically comprises steps of:
   S31: removing impurities comprising oil, fingerprint, dust, mold release and rust on the surface of the alloy frame which affect the bonding;
   S32: cleaning the surface via a dry cloth with acetone, butanone or isopropyl-ketone; and
   S33: making an oil injection after cleaning.

3. The method, as recited in claim 1, wherein conditions of drying are: a drying time of 1.5 hours and a humidity of 45%; or a drying time of 4 min and a temperature of 93°; or a drying time of 2 min and a temperature of 138 degrees Celsius.

4. The method, as recited in claim 1, wherein the basecoat glue and the topcoat glue are used by soaking, brushing or spraying methods, and a sum of thicknesses of two glues is in a range from 2.5 μm to 12.7 μm.

5. The method, as recited in claim 1, wherein the basecoat glue is CH219-model basecoat glue, and the topcoat glue is CH213-model topcoat glue.

* * * * *